United States Patent
Takagi et al.

(10) Patent No.: US 9,910,486 B2
(45) Date of Patent: Mar. 6, 2018

(54) CONTROLLING POWER ALLOCATION IN A SERVER SYSTEM THAT UTILIZES SUPPLEMENTAL BATTERIES

(71) Applicant: NEC Corporation, Minato-ku, Tokyo (JP)

(72) Inventors: Hitoshi Takagi, Tokyo (JP); Jun Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/895,333

(22) PCT Filed: May 30, 2014

(86) PCT No.: PCT/JP2014/064450
§ 371 (c)(1),
(2) Date: Dec. 2, 2015

(87) PCT Pub. No.: WO2014/196473
PCT Pub. Date: Dec. 11, 2014

(65) Prior Publication Data
US 2016/0116975 A1    Apr. 28, 2016

(30) Foreign Application Priority Data
Jun. 4, 2013   (JP) ................ 2013-118362

(51) Int. Cl.
*G06F 1/32*   (2006.01)
*G06F 1/26*   (2006.01)
*H02J 1/00*   (2006.01)

(52) U.S. Cl.
CPC ............ *G06F 1/3296* (2013.01); *G06F 1/263* (2013.01); *H02J 1/00* (2013.01)

(58) Field of Classification Search
CPC ........... G06F 1/3296; G06F 1/263; H02J 1/00
(Continued)

(56) References Cited

U.S. PATENT DOCUMENTS 7,617,406 B2    11/2009   Yasuo
8,006,108 B2     8/2011   Brey et al.
(Continued)

FOREIGN PATENT DOCUMENTS

CN    102096460 A     6/2011
CN    102842936 A    12/2012
(Continued)

OTHER PUBLICATIONS

International Search Report for PCT Application No. PCT/JP2014/064450, dated Jul. 22, 2014.
(Continued)

*Primary Examiner* — Thomas Lee
*Assistant Examiner* — Santosh R Poudel

(57) ABSTRACT

This invention provides a server system in which a plurality of servers are divided into a plurality of groups in accordance with a physical arrangement. The server system includes at least one system power provider that distributes and provides system power to each of the plurality of groups, a battery that corresponds to each of the plurality of groups and provides stored power to at least two servers included in the group, and a controller that controls each of the servers included in one group based on power providable by the system power provider and the battery.

9 Claims, 15 Drawing Sheets

(58) Field of Classification Search
USPC .......................................................... 713/320
See application file for complete search history.

(56) References Cited

U.S. PATENT DOCUMENTS

| | | | | | |
|---|---|---|---|---|---|
| 8,468,375 | B2* | 6/2013 | Mori | ..................... | G06F 3/0625 |
| | | | | | 700/291 |
| 8,723,362 | B2* | 5/2014 | Park | ........................ | G06F 1/30 |
| | | | | | 307/64 |
| 2004/0010649 | A1* | 1/2004 | Weaver | ..................... | H02J 9/00 |
| | | | | | 710/302 |
| 2005/0055587 | A1* | 3/2005 | Lee | .......................... | G06F 1/28 |
| | | | | | 713/300 |
| 2005/0289371 | A1 | 12/2005 | Makiyama et al. | | |
| 2007/0186121 | A1* | 8/2007 | Yasuo | ................... | G06F 1/3203 |
| | | | | | 713/320 |
| 2010/0064151 | A1 | 3/2010 | Saeki | | |
| 2011/0144818 | A1 | 6/2011 | Li et al. | | |
| 2012/0116590 | A1* | 5/2012 | Florez-Larrahondo | . | G06F 1/206 |
| | | | | | 700/275 |
| 2013/0226362 | A1* | 8/2013 | Jagadishprasad | ..... | G06F 9/5094 |
| | | | | | 700/297 |
| 2013/0283068 | A1* | 10/2013 | Li | ........................ | G06F 1/3203 |
| | | | | | 713/300 |
| 2014/0077606 | A1* | 3/2014 | Ci | ............................ | H02J 1/00 |
| | | | | | 307/72 |
| 2014/0331070 | A1* | 11/2014 | Du | ........................ | H02J 9/061 |
| | | | | | 713/340 |

FOREIGN PATENT DOCUMENTS

| | | |
|---|---|---|
| JP | 2006-011793 A | 1/2006 |
| JP | 2007-213167 A | 8/2007 |
| JP | 2008-083841 A | 4/2008 |
| JP | 2009-116862 A | 5/2009 |
| JP | 2009-140138 A | 6/2009 |
| JP | 2010-066850 A | 3/2010 |
| JP | 2011-223786 A | 11/2011 |
| JP | 2012-053899 A | 3/2012 |
| WO | 2012/014731 A1 | 2/2012 |

OTHER PUBLICATIONS

Japanese Office Action for JP Application No. 2013-118362 dated Mar. 16, 2017 with English Translation.
Chinese Office Action for CN Application No. 201480032128.4 dated Apr. 26, 2017 with English Translation.

* cited by examiner

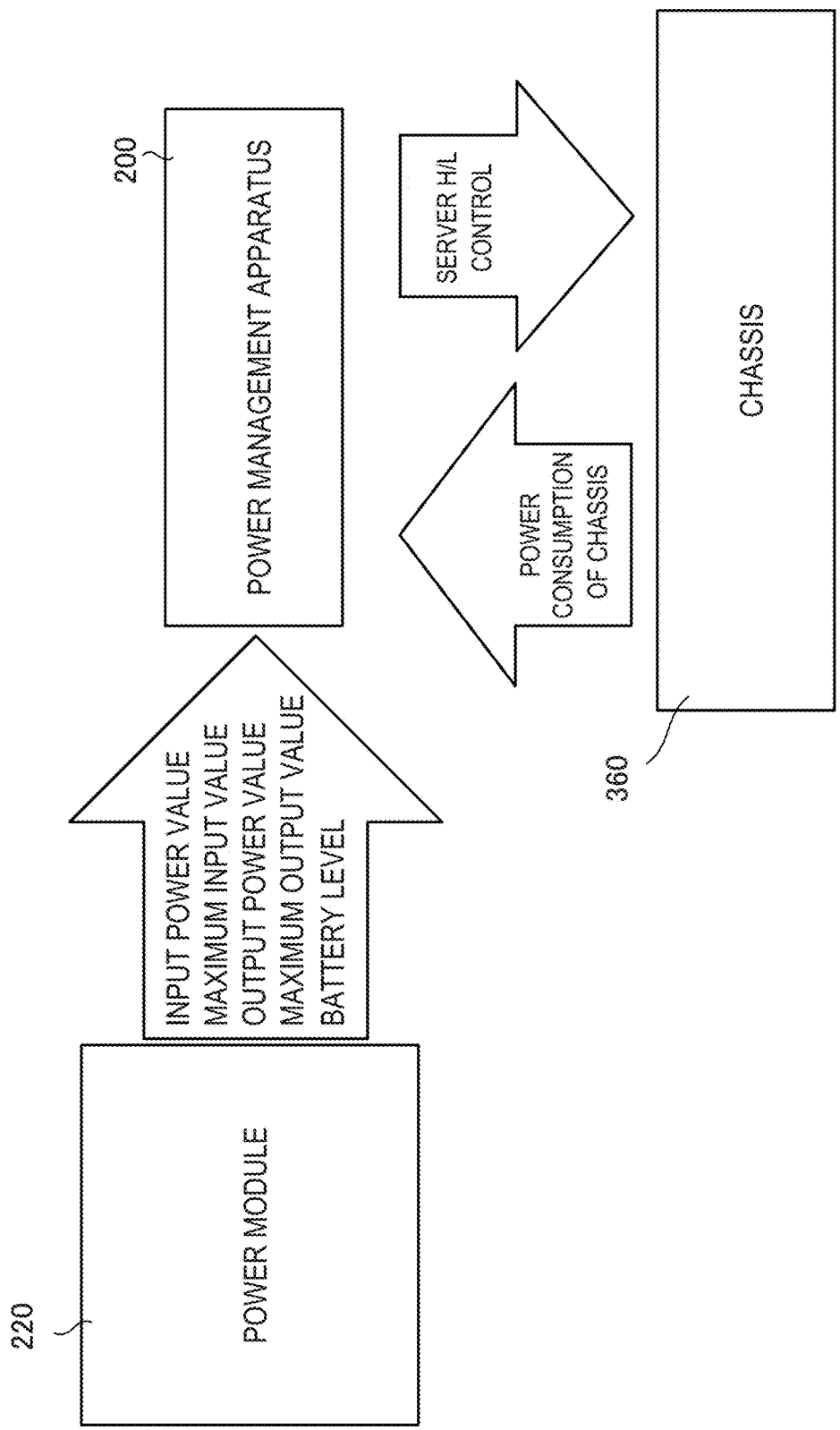
F I G. 4B

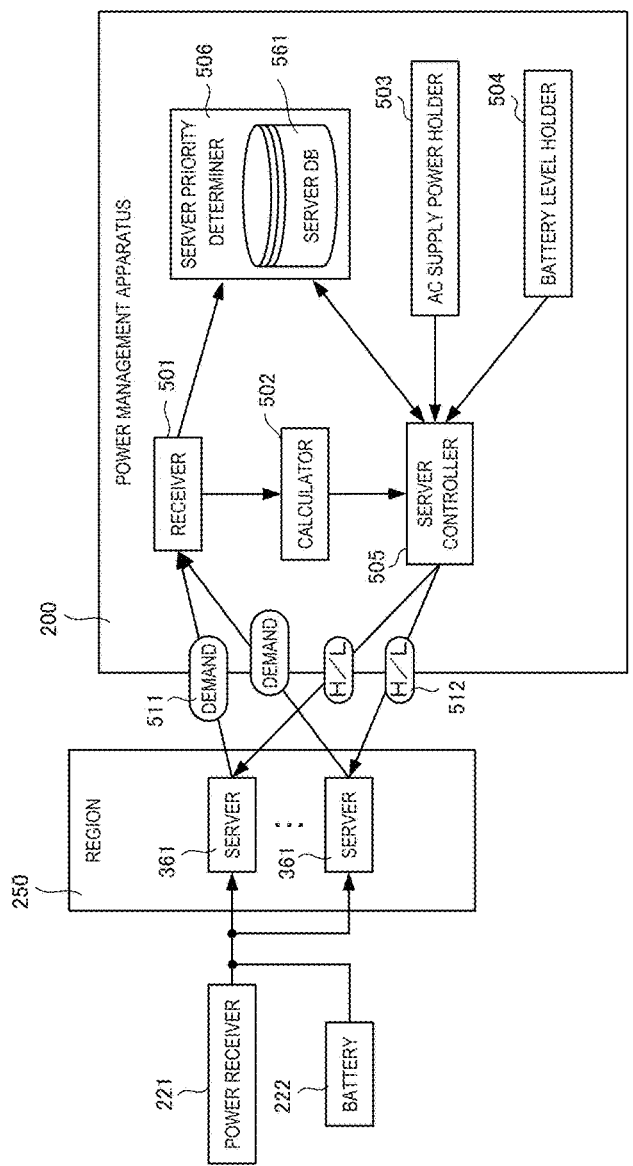
F I G. 5

| | MAXIMUM USED ELECTRIC ENERGY (W) | MINIMUM USED ELECTRIC ENERGY (W) | REQUESTED ELECTRIC ENERGY (W) | PRIORITY OF APPLICATION IN PROGRESS | SERVER PRIORITY |
|---|---|---|---|---|---|
| SERVER A | 100 | 50 | 80 | 1 | 1 |
| SERVER B | 130 | 70 | 110 | 2 | 2 |
| SERVER C | 170 | 20 | 100 | 3 | 3 |
| SERVER D | 50 | 40 | 50 | 4 | 5 |
| ... | ... | ... | ... | ... | ... |

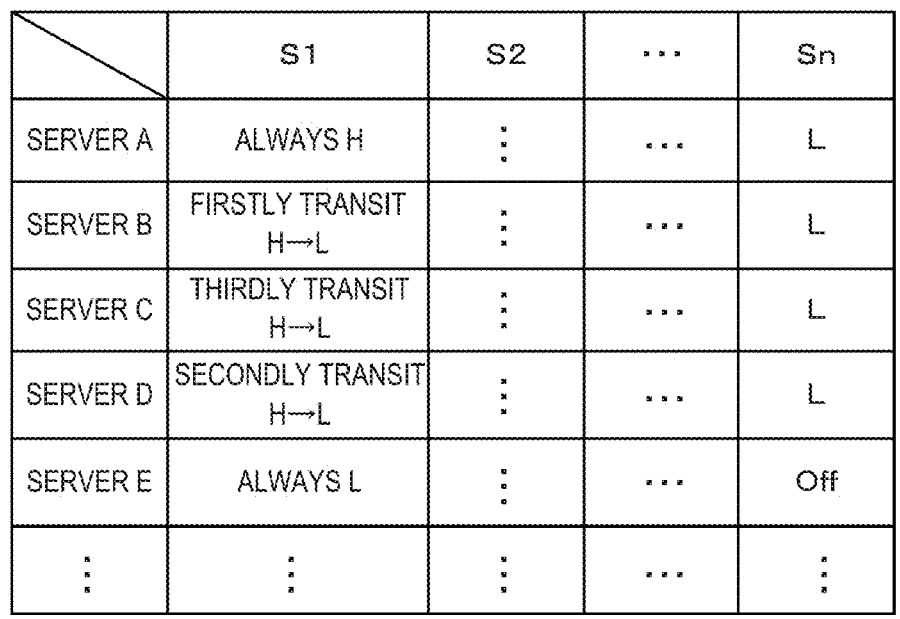
F I G. 8

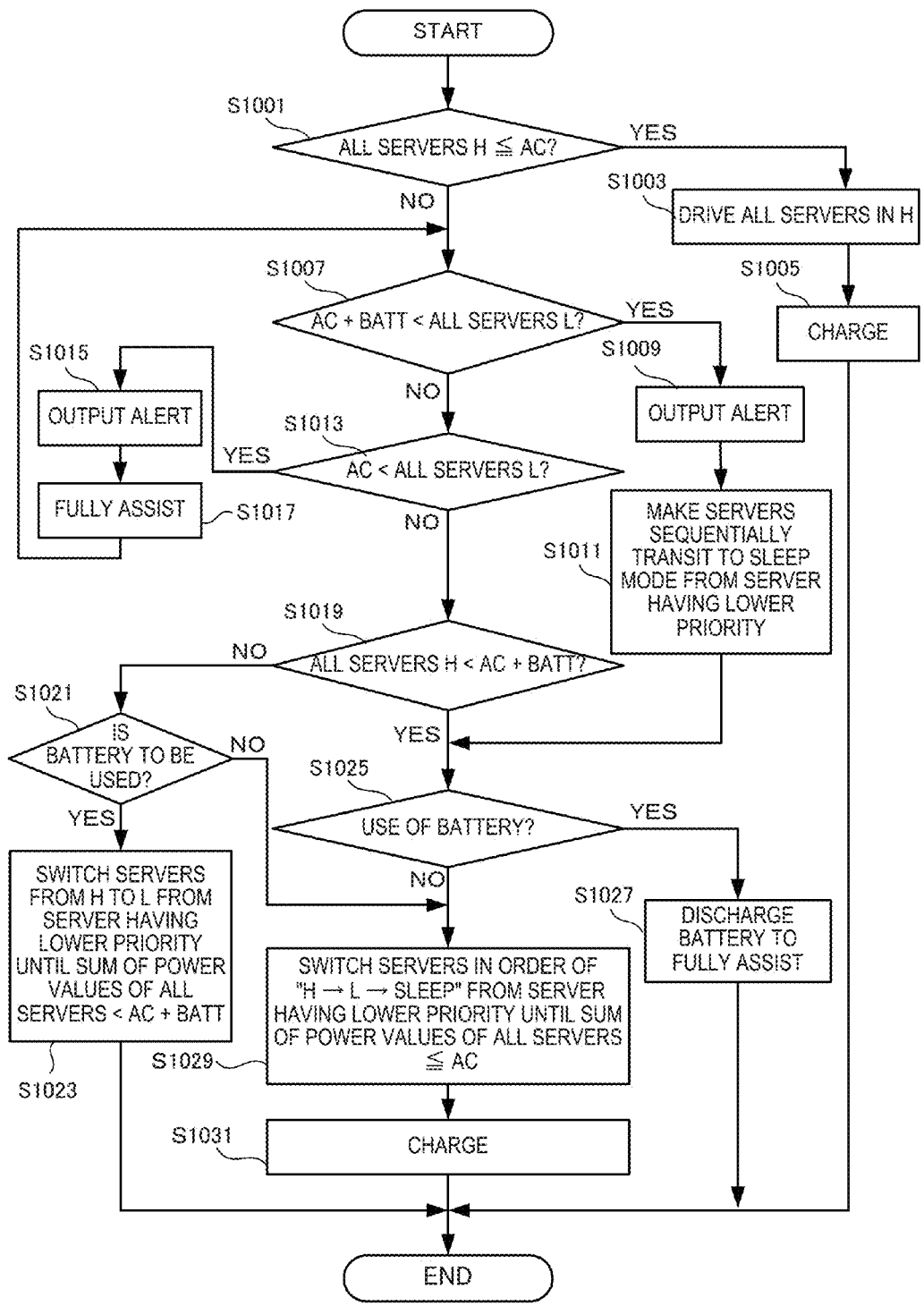
F I G. 10

| | MAXIMUM USED ELECTRIC ENERGY (W) | MINIMUM USED ELECTRIC ENERGY (W) | REQUESTED ELECTRIC ENERGY (W) | REGION PRIORITY | BATTERY |
|---|---|---|---|---|---|
| REGION A | 100 | 50 | 80 | 1 | NONE |
| REGION B | 130 | 70 | 110 | 2 | 150W/300W |
| REGION C | 170 | 20 | 100 | 3 | 100W/200W |
| REGION D | 50 | 40 | 50 | 4 | 150W/150W |
| ... | ... | ... | ... | ... | ... |

1401

F I G. 14

CONTROLLING POWER ALLOCATION IN A SERVER SYSTEM THAT UTILIZES SUPPLEMENTAL BATTERIES

This application is a National Stage Entry of PCT/JP2014/064450 filed on May 30, 2014 which claims priority from Japanese Patent Application 2013-118362 filed on Jun. 4, 2013, the contents of all of which are incorporated herein by reference, in their entirety.

TECHNICAL FIELD

The present invention relates to a technique of managing power supplied to a plurality of servers.

BACKGROUND ART

In the above technical field, patent literature 1 discloses a technique of supplying, to an apparatus main body, power supplied from a power supply unit and secondary battery.

CITATION LIST

Patent Literature

Patent literature 1: Japanese Patent Laid-Open No. 2011-223786

SUMMARY OF THE INVENTION

Technical Problem

The technique described in the above literature, however, controls power supply to one apparatus main body, and does not consider power supply to a plurality of targets. Therefore, in a server system constituted by a plurality of servers, when supplying power using a battery, maintenance is not easy.

The present invention enables to provide a technique of solving the above-described problem.

Solution to Problem

One aspect of the present invention provides a server system in which a plurality of servers are divided into a plurality of groups in accordance with a physical arrangement, comprising:
at least one system power provider that distributes and provides system power to each of the plurality of groups;
a battery that corresponds to each of the plurality of groups and provides stored power to at least two servers included in the group; and
a controller that controls each of the servers included in one group based on power providable by the system power provider and the battery.

Another aspect of the present invention provides a control method for a server system in which a plurality of servers are divided into a plurality of groups in accordance with a physical arrangement, comprising:
causing a system power provider to distribute and provide system power to each of the plurality of groups;
providing stored power from a battery provided in correspondence with each of the plurality of groups to at least two servers included in the group; and
controlling each of the servers included in one group based on power providable by the system power provider and the battery.

Still other aspect of the present invention provides a control program, of a server system in which a plurality of servers are divided into a plurality of groups in accordance with a physical arrangement, for causing a computer to execute a method, comprising:
causing a system power provider to distribute and provide system power to each of the plurality of groups;
providing stored power from a battery provided in correspondence with each of the plurality of groups to at least two servers included in the group; and
controlling each of the servers included in one group based on power providable by the system power provider and the battery.

Advantageous Effects of Invention

According to the present invention, it is possible to facilitate maintenance of a server system that supplies power to a plurality of servers using system power and a battery.

BRIEF DESCRIPTION OF DRAWINGS

FIG. 4B is a view showing exchange of power supply relationship information according to the second embodiment of the present invention;

FIG. 5 is a block diagram showing the functional arrangement of a power management apparatus according to the second embodiment of the present invention;

FIG. 7 is a table for explaining the function of the power management apparatus according to the second embodiment of the present invention;

FIG. 8 is a table for explaining the function of the power management apparatus according to the second embodiment of the present invention;

FIG. 10 is a flowchart for explaining a processing procedure by the power management apparatus according to the second embodiment of the present invention;

FIG. 14 is a table showing the server system according to the fourth embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[First Embodiment]

Figure 1:
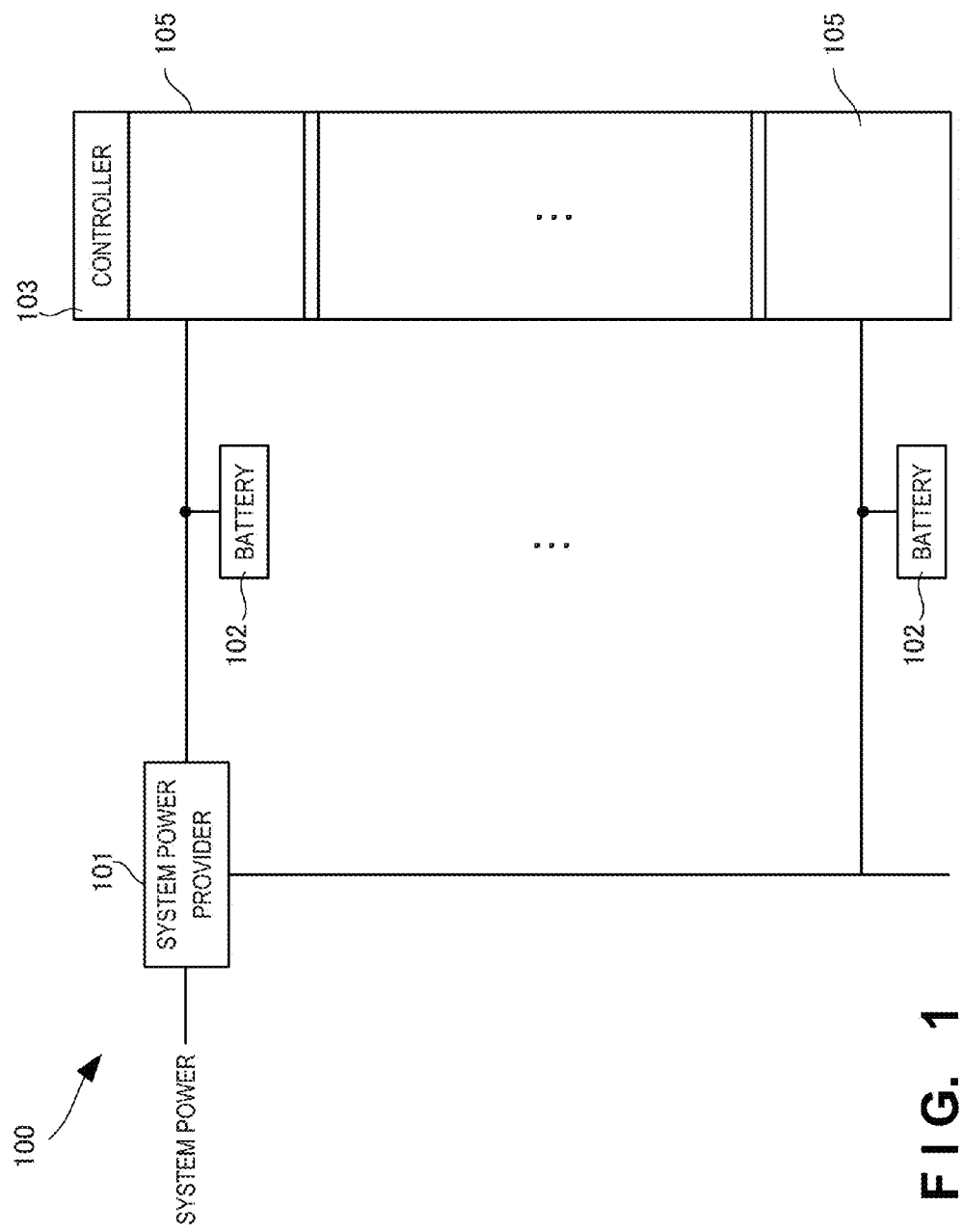
FIG. 1 is a block diagram showing the arrangement of a power management apparatus according to the first embodiment of the present invention.

A server system 100 according to the first embodiment of the present invention will be described with reference to FIG. 1. The server system 100 includes at least one system power provider 101, a plurality of batteries 102, and a controller 103.

In the server system 100, a plurality of servers are divided into a plurality of groups 105 in accordance with a physical arrangement. The system power provider 101 distributes and provides system power to each of the plurality of groups 105. On the other hand, the battery 102 is provided for each of the plurality of groups 105, and provides stored power to at least two servers included in the corresponding group 105. The controller 103 controls each server included in one group 105 based on power providable by the system power provider 101 and the corresponding battery 102.

With the above arrangement, it is possible to independently supply system power and battery power to the plurality of server groups, thereby facilitating maintenance.

[Second Embodiment]

Figure 2:
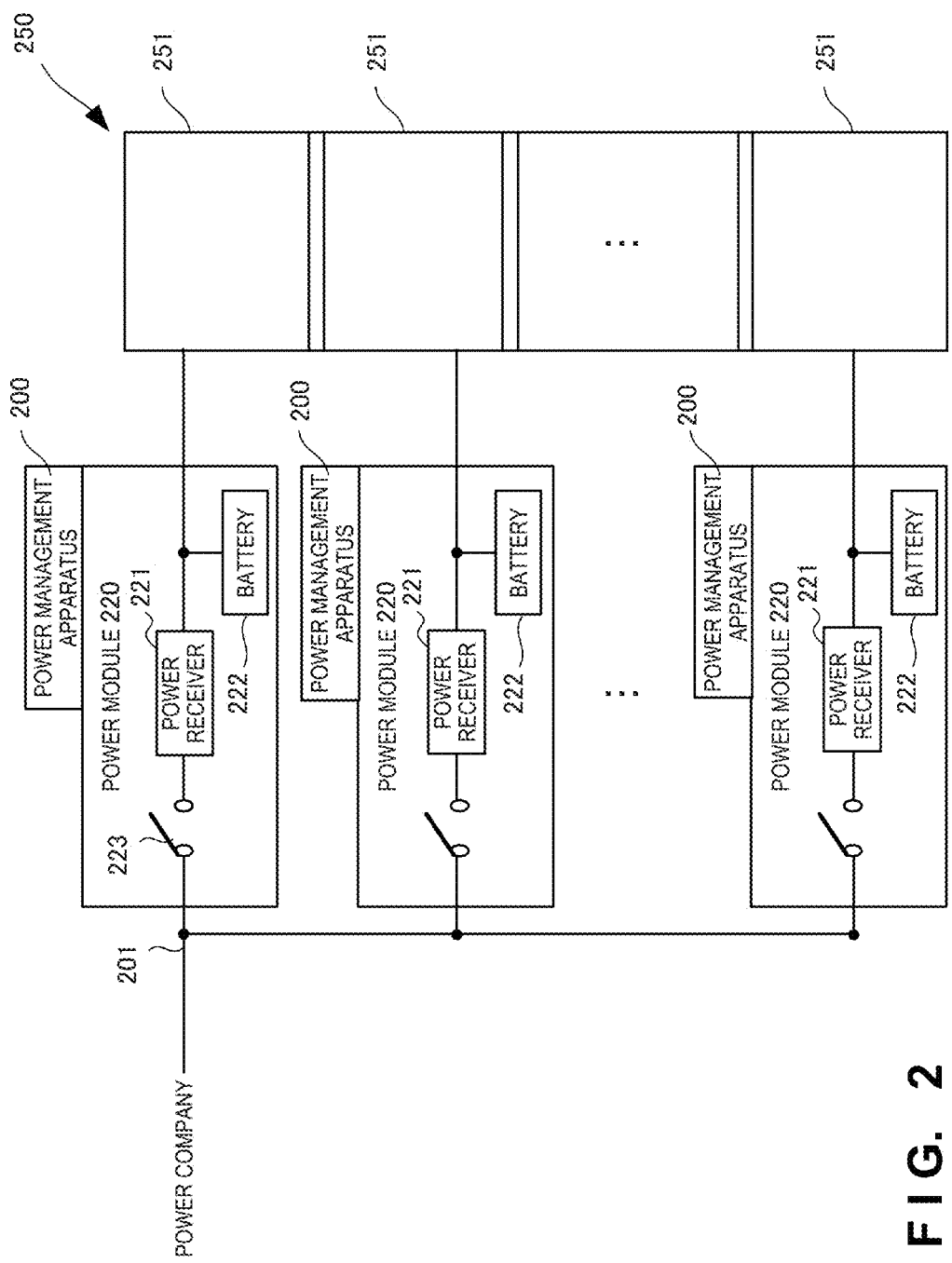
FIG. 2 is a block diagram showing the power-related configuration of a server system according to the second embodiment of the present invention.

A power management apparatus according to the second embodiment of the present invention will be described with reference to FIGS. 2 to 10. FIG. 2 is a block diagram showing the power-related configuration of a server system according to this embodiment.

Referring to FIG. 2, in a rack 250 storing a plurality of servers, a power module 220 and a power management apparatus 200 are prepared for each region 251 that is a predetermined physical region. The power module 220 includes a power receiver 221 that receives system power from a power company and supplies it to a server in the rack 250, and a battery 222 that accumulates the power supplied from the power receiver 221. The battery 222 has different performance for each region 251, and has the maximum power storage amount corresponding to power requested in each region 251. If the power supplied from the power receiver 221 to the region 251 has a surplus, this surplus power can be used as storage power of the battery 222. Each power module 220 includes a switch 223, and the switch 223 and a line 201 for the system power supplied from the power company are combined with each other to function as a system power provider for distributing and providing the system power to a corresponding one of the plurality of regions 251.

Each power management apparatus 200 monitors the power receiver 221 and battery 222 of the corresponding power module 220, and controls each server in accordance with a suppliable power value. FIG. 2 shows the arrangement in which the plurality of power management apparatuses 200 are associated with the respective power modules 220. However, the present invention is not limited to this.

Figure 3:
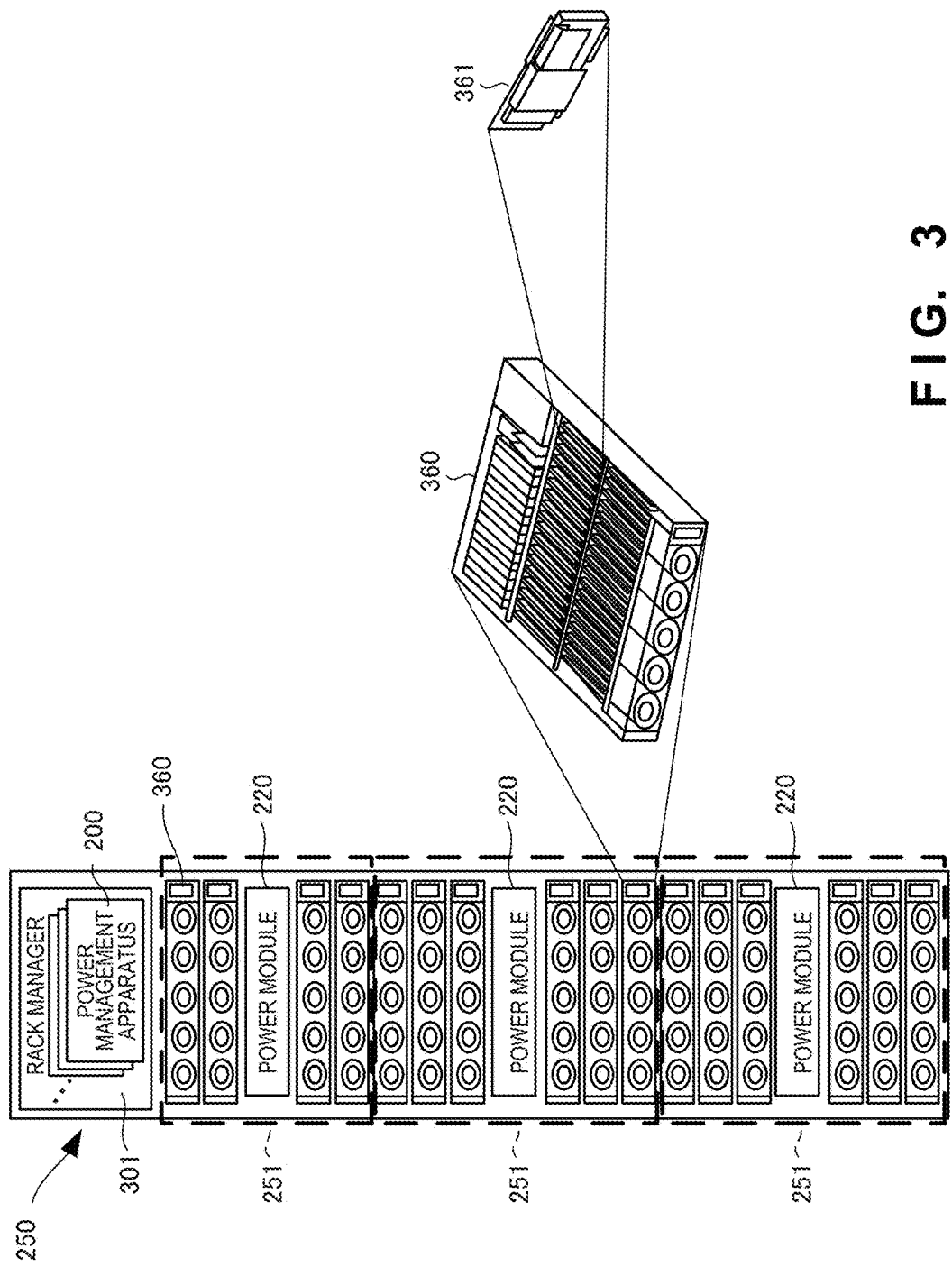
FIG. 3 is a view showing the hardware configuration of the server system according to the second embodiment of the present invention.

FIG. 3 is a view showing the hardware configuration of the server system according to this embodiment. The server system rack 250 includes a rack manager 301, a plurality of chassis 360, and the plurality of power modules 220. The rack manager 301 includes the power management apparatuses 200, the number of which is equal to that of regions 251, and manages power of the overall rack. The power module 220 is prepared for each region 251, and supplies power to the plurality of chassis 360 included in the corresponding region 251. Each chassis 360 incorporates a plurality of servers 361. That is, each region 251 can be regarded as a group including the plurality of servers 361.

Figure 4A:
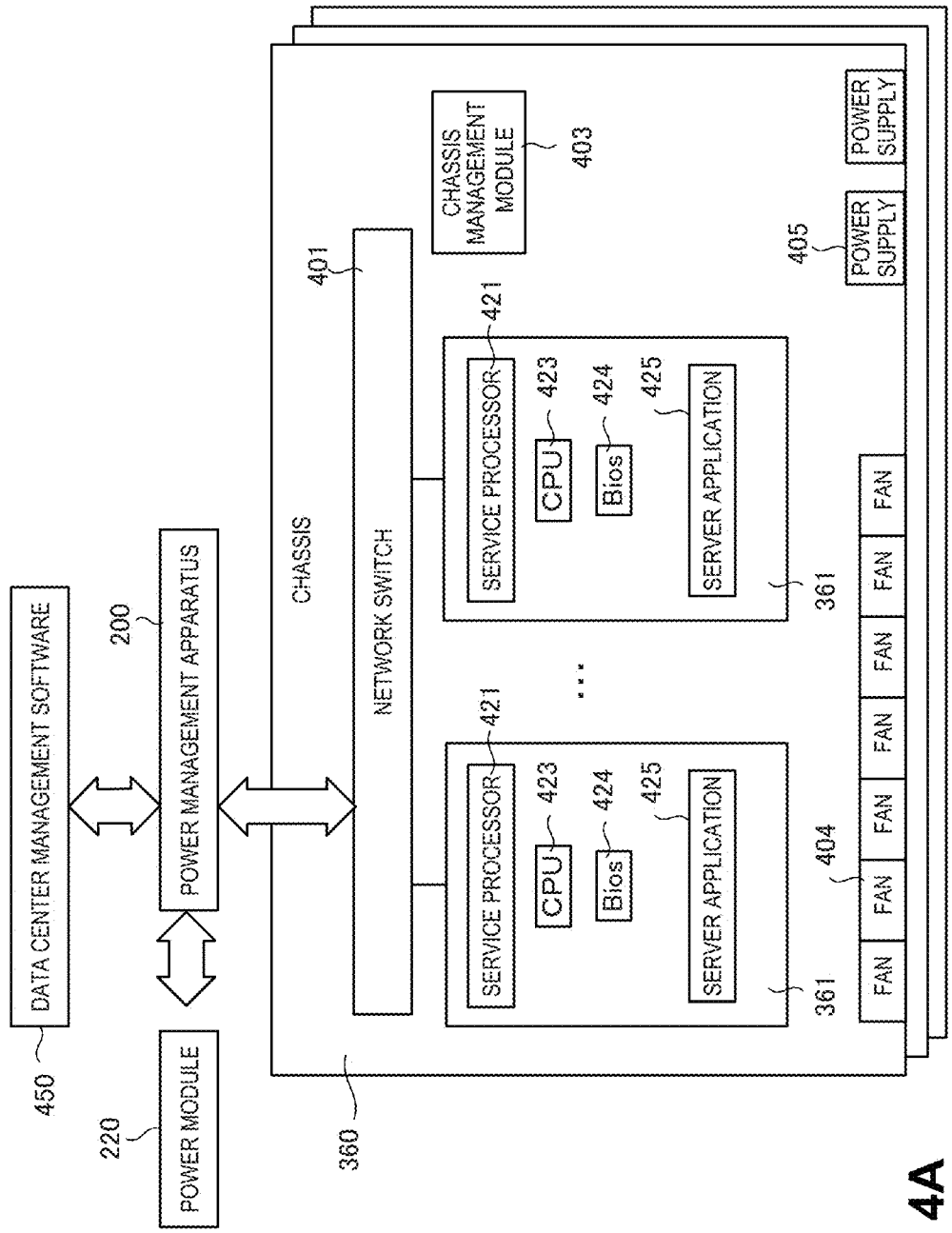
FIG. 4A is a view showing the hardware arrangement and software arrangement of a chassis according to the second embodiment of the present invention.

FIG. 4A is a view showing the hardware arrangement and software arrangement of each chassis according to this embodiment. The power management apparatus 200 is controlled by data center management software 450. Each chassis 360 includes a network switch 401, the plurality of servers 361, a chassis management module 403, fans 404, and power supplies 405. Each server 361 includes a service processor 421 called a BMC (Base board Management Controller) and a CPU 423 called an SoC (System on Chip). This CPU 423 is a CPU LSI, and incorporates, in the same chip, a function conventionally implemented by another LSI, such as SATA (Serial Advanced Technology Attachment)/SAS (Serial Attached Small Computer System Interface), PCIexpress (Peripheral Component Interconnect Express), or Ethernet® in addition to a CPU core.

FIG. 4B is a view showing exchange of power supply relationship information according to this embodiment. The power management apparatus 200 is provided, from the power module 220, with an input power value (the value of external power used by the power module 220), a maximum input power value (the maximum value of external power providable to the region), an output power value (a power value provided by the power module to the region), a maximum output power value (the sum of external power and the battery supply power), and a battery level. On the other hand, the power management apparatus 200 accepts the power consumption of the chassis 360 from the chassis 360. The power management apparatus 200 sends an H/L control instruction to each server in the chassis 360.

FIG. 5 is a block diagram showing the functional arrangement of the power management apparatus according to this embodiment.

A receiver 501 receives, from each of the plurality of servers 361, a demand 511 as power request information about an electric energy requested by each of the plurality of servers 361.

Based on the demands 511, a calculator 502 calculates the total electric energy requested by the plurality of servers 361. An AC supply power holder 503 holds an AC power value supplied from the power receiver 221 that can supply power to a plurality of information processing apparatuses. A battery level holder 504 holds the battery level value of each battery 222 that can supply power to the plurality of servers 361.

A server controller 505 controls the plurality of servers 361 based on the demands 511, AC power value, and battery level value. Especially, each server 361 can be driven in at least two driving modes including a high-power mode (H mode) in which the power consumption is large and a low-power mode (L mode) in which the power consumption is small. The server controller 505 determines a driving mode (H/L) 512 of each of the plurality of servers.

The power management apparatus 200 includes a server priority determiner 506 that determines the priority of each of the plurality of servers 361. The server priority determiner 506 includes a server database 561 in which the attributes of each server 361 and a priority derived from the attributes are set. When the demand 511 is smaller than the total power value of the AC power value and the battery level value, the server controller 505 determines whether to use the battery 222. If it is determined to use the battery 222, the plurality of servers 361 are driven using both power from the power receiver 221 and power from the battery 222. On the other hand, if it is determined not to use the battery 222, the driving modes (H/L) 512 of the plurality of servers are controlled in accordance with the priorities so as to drive the plurality of servers 361 by only power from the power receiver 221.

If it is determined not to use the battery 222, the server controller 505 controls to drive the server having a lower priority in a mode in which the power consumption is smaller than that of the server having a higher priority, so as to drive the plurality of servers 361 by only power from the power receiver 221. That is, the server having a higher priority is driven in the H mode and the server having a lower priority is driven in the L mode. For example, when the level of the battery 222 is equal to or smaller than a predetermined value, the server controller 505 controls to drive the server having a lower priority in a mode in which the power consumption is smaller than that of the server having a higher priority, so as to drive the plurality of servers by only power from the power receiver 221.

Figure 6:
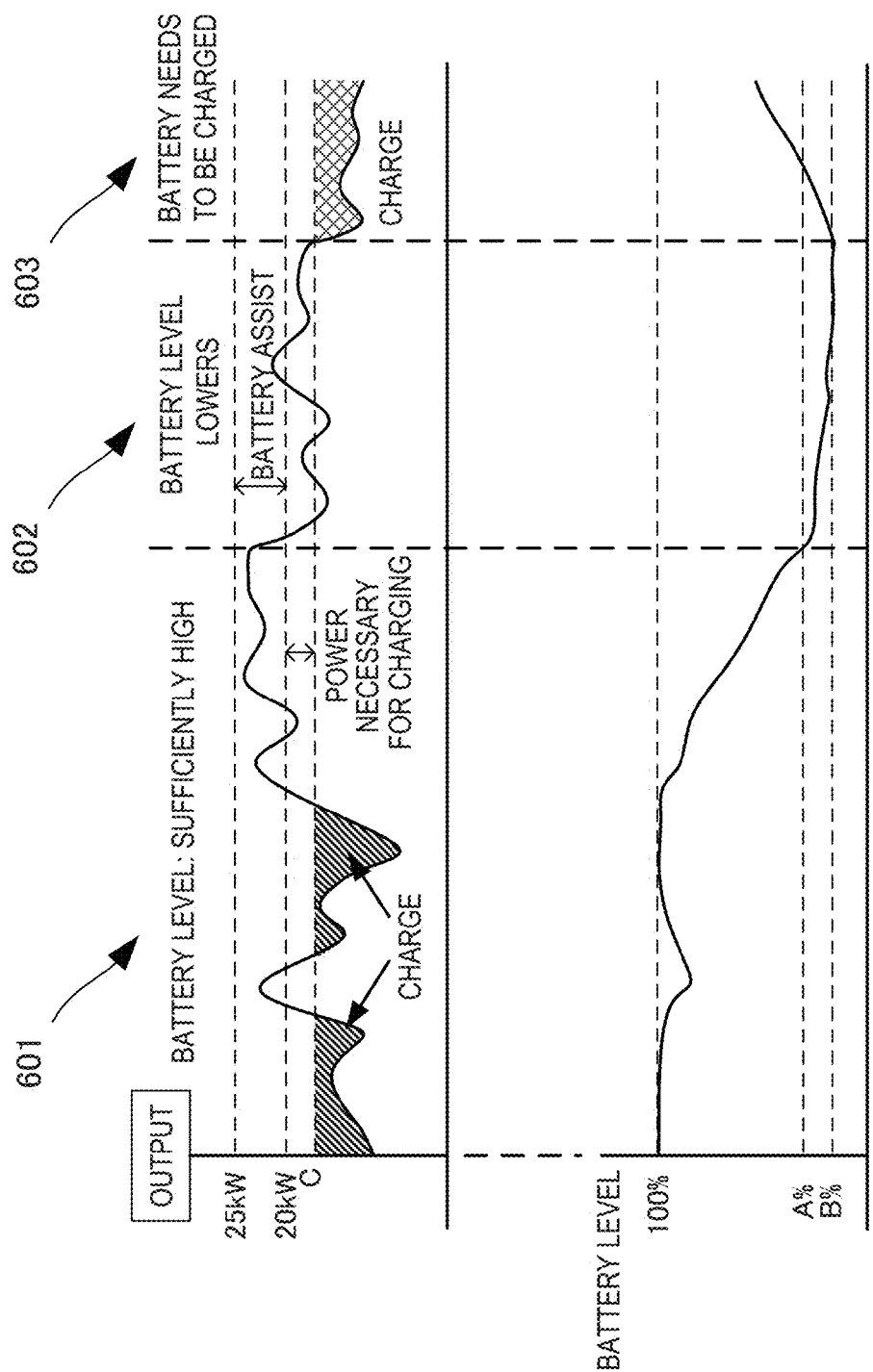
FIG. 6 is a graph for explaining the function of the power management apparatus according to the second embodiment of the present invention.

FIG. 6 is a graph for explaining the function of the power management apparatus according to this embodiment. For example, assume that the maximum output power is 25 kW and the input power is 20 kW. In this case, while the battery level is sufficiently high, when the output power becomes C kW or smaller, the battery is charged, and when the output power exceeds 20 kW, the server transits to a battery assist mode (a mode in which the battery 222 is used). On the other hand, if the power level of the battery 222 lowers (becomes, for example, A % or lower) by using the battery 222, the server other than that having a high priority cannot transit to the battery assist mode, and the driving modes of some servers are changed to a power saving mode, as needed. If the level of the battery 222 further lowers (becomes, for example, B % or lower), the battery assist mode is not permitted, and the servers 361 are actively set in the low-power mode to charge the battery 222. Assume that a system operator can set the values of the thresholds A, B, and C.

FIG. 7 is a table for explaining contents of the server database 561 of the power management apparatus according to this embodiment. The server database 561 stores a maximum used electric energy, a minimum used electric energy, a requested electric energy, the priority of an application in progress, and the like which have been received from each server 361 as the demand 511. The server priority determiner 506 determines a server priority in accordance with the electric energies and application, and sets it in the server database 561. Various priority determination methods can be considered. For example, an ID may be assigned to the hardware of each server 361, and the servers may be physically divided into the first, second, and third groups. The priority may be determined in accordance with a fee (SLA: Service-Level Agreement) paid by the user of the server 361. The priority may be logically determined based on the type of OS (Operation System) or the type of executable application. The priority may be determined by "self-assessment" by the server 361.

FIG. 8 is a table showing detailed contents of the priorities determined in the power management apparatus according to this embodiment. In a table 801, how to drive the respective servers 361 is determined in accordance with a status (one of statuses S1 to Sn) such as a time zone. For example, in the status S1, server A is always driven in the H mode, and server E is always driven in the L mode. Servers B to D are made to transit from the H mode to the L mode in accordance with the supply power value in the order of servers B, D, and C. For example, in the status Sn (at the time of a power failure or the like), servers A to D are driven in the L mode and server E is turned off (set in a sleep mode).

Figure 9:
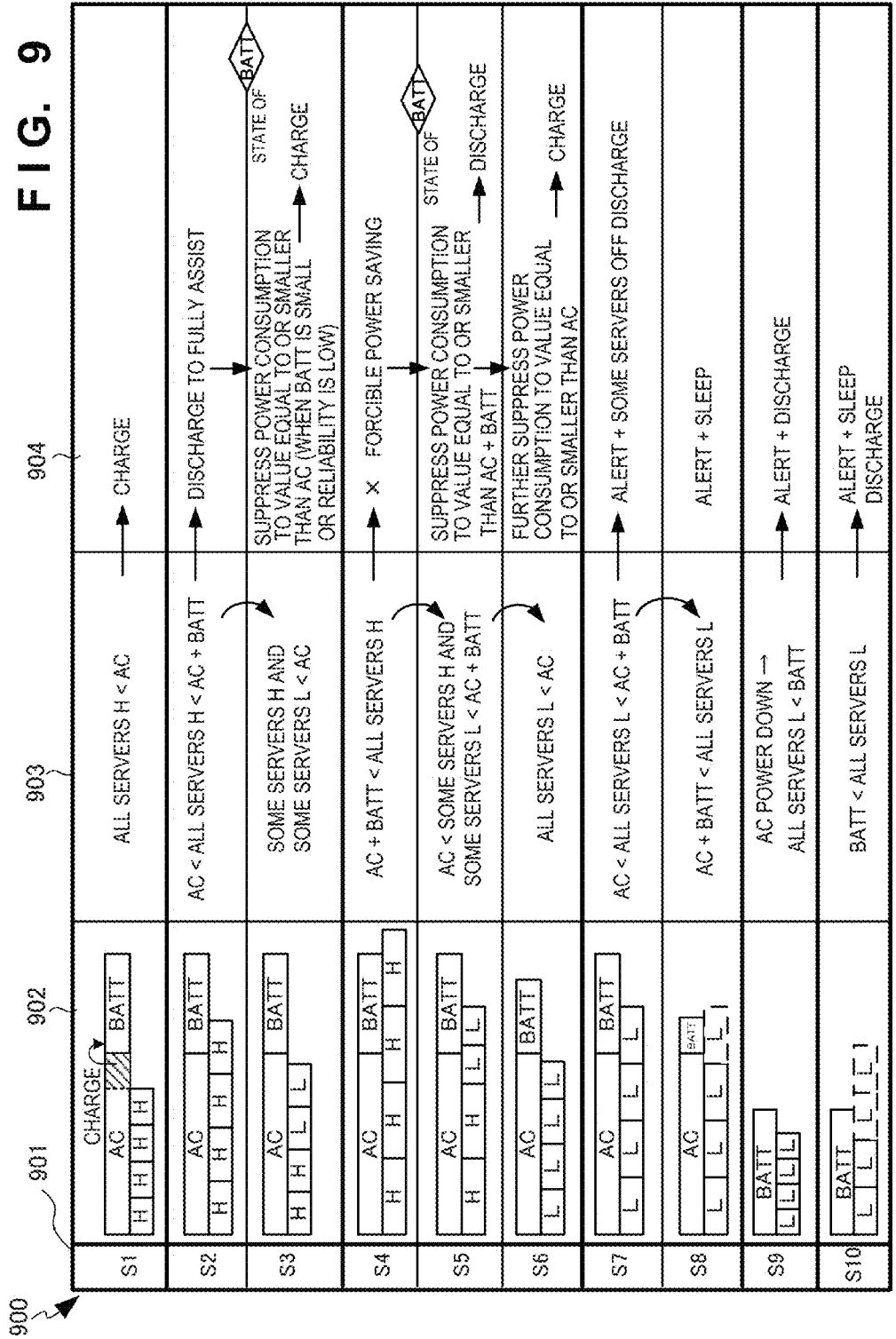
FIG. 9 is a table for explaining the function of the power management apparatus according to the second embodiment of the present invention.

FIG. 9 is a table for explaining the function of the power management apparatus according to this embodiment. FIG. 9 shows a table 900 indicating an example of driving control of the servers in each status. In the table 900, server control methods in 10 statuses S1 to S10 are exemplified. Each field 901 indicates a status number. Each field 902 schematically indicates suppliable power (an upper bar) in each status, and the driving modes (a lower bar) of the respective servers. The upper bar in each field 902 indicates the magnitudes of system power (AC) and battery power (BATT) that can be output to the region 251. On the other hand, lower bar in each field 902 indicates the magnitudes of the power consumptions of the servers 361 (only four servers in this example), and characters in the bar indicate the driving modes of the respective servers 361.

Each field 903 indicates a status using an expression, and each field 904 indicates the state of the battery or the like.

The status S1 indicates a status in which the total power consumption (required power) when all the servers are driven in the H mode does not exceed the supply power value (AC) of the system power. In this case, it is not necessary to use the battery 222, and a surplus component of the system power is used to charge the battery 222.

The status S2 indicates a status in which the total power consumption when all the servers are driven in the H mode exceeds the supply power value (AC) of the system power but does not exceed the maximum suppliable power value (AC+BATT) obtained by adding the power of the battery 222 to the supply power value. In this case, the battery 222 may be discharged to fully assist, thereby driving all the servers in the H mode. Alternatively, in this status, when the remaining power value of the battery 222 becomes smaller than a predetermined value or the reliability of the battery 222 deteriorates, the status may transit to the status S3.

The status S3 indicates a status in which the battery 222 cannot be used or is not used. In this status, until the power consumption of all the servers becomes equal to or smaller than the supply power value (AC) of the system power, the servers are made to sequentially transit to the L mode (the power consumption is suppressed to a value equal to or smaller than the power value AC) from the server having a lower priority. If the system power has a surplus, the battery 222 is charged.

The status S4 indicates a status in which the total power consumption when all the servers are driven in the H mode exceeds the maximum suppliable power value (AC+BATT) obtained by adding the power of the battery 222 to the supply power value of the system power. In this case, even if the battery 222 is discharged to fully assist, it is impossible to drive all the servers in the H mode.

In this case, as shown in the status S5, until the power consumption of all the servers becomes equal to or smaller than the maximum suppliable power value (AC+BATT), the servers are made to sequentially transit to the L mode (the power consumption is suppressed to a value equal to or smaller than the maximum power value AC+BATT) from the server having a lower priority. In this status S5, when the remaining power value of the battery 222 becomes smaller than the predetermined value or the reliability of the battery 222 deteriorates, the status transits to the status S6.

The status S6 indicates a status in which the battery 222 cannot be used or is not used. In this status, until the power consumption of all the servers becomes equal to or smaller than the supply power value (AC) of the system power, the servers are made to sequentially transit to the L mode (the power consumption is suppressed to a value equal to or smaller than the power value AC) from the server having a lower priority. If the system power has a surplus, the battery 222 is charged.

The status S7 indicates a status in which the total power consumption when all the servers are driven in the L mode exceeds the supply power value (AC) of the system power but does not exceed the maximum suppliable power value (AC+BATT) obtained by adding the power of the battery 222 to the supply power value. In this case, the battery 222 may be discharged to fully assist, thereby driving all the servers in the L mode. Alternatively, in this status, if the remaining power value of the battery 222 becomes smaller than the predetermined value or the reliability of the battery 222 deteriorates, the status may transit to the status S8.

The status S8 indicates a status in which the battery 222 cannot be used or is not used. In this status, until the power consumption of all the servers becomes equal to or smaller than the supply power value (AC) of the system power, the servers are made to sequentially transit to the sleep mode (the power consumption is suppressed to a value equal to or smaller than the power value AC) from the server having a lower priority. At the same time, an alert is output to indicate that the electric energy is short.

The status S9 indicates a status in which the system power is down due to a power failure, maintenance, or the like. In this status, if the total power consumption when all the servers are driven in the L mode does not exceed the suppliable power value of the battery 222, the apparatus drives all the servers 361 in the power saving mode to gain time, outputs an alert, and waits for power to come back.

The status S10 indicates another status in which the system power is down due to a power failure, maintenance, or the like. In this status, if the total power consumption when all the servers are driven in the L mode exceeds the suppliable power value of the battery 222, the servers are made to sequentially transit to the sleep mode from the server 361 having a lower priority. At the same time, the apparatus outputs an alert, and waits for power to come back.

FIG. 9 shows the system power on the left side and the battery on the right side in the bar graph of each field 902 by assuming that the reliability of the system power is higher than that of the battery 222. However, the order can be reversed. That is, it may be controlled to actively use the battery, and use the system power only when the supply power value of the battery is smaller than a predetermined value. In this case, it is controlled to suppress the power consumption of the servers to a value equal to or smaller than the battery power value by controlling the driving modes of the servers.

FIG. 10 is a flowchart for explaining a processing procedure complying with FIG. 9 in the power management apparatus according to this embodiment.

In step S1001, it is determined whether the sum of power values required when all the servers in a region are driven in the H mode is equal to or smaller than the supply power value AC of the system power. If the sum of the power values required when all the servers are driven in the H mode is equal to or smaller than the supply power value AC of the system power, the process advances to step S1003 to drive all the servers in the high-output mode (H mode). Then, the battery is charged in step S1005.

If it is determined in step S1001 that the sum of the power values required when all the servers in the region are driven in the H mode is larger than the supply power value AC of the system power (the status S2 shown in FIG. 9), the process advances to step S1007. If it is determined in step S1007 that the sum of the supply power value AC of the system power and the supply power value BATT of the battery 222 is smaller than the sum of power values required when all the servers in the region are driven in the L mode (status S8), the process advances to step S1009. In step S1009, an alert is output, and the process advances to step S1011. In step S1011, until the sum of the required powers of all the servers in the region becomes smaller than the sum of the supply power value AC of the system power and the supply power value BATT of the battery 222, the servers are made to sequentially transit to the sleep mode from the server having a lower priority, and the process advances to step S1025.

If it is determined in step S1007 that the sum of the supply power value AC of the system power and the supply power value BATT of the battery 222 is equal to or larger than the sum of the power values required when all the servers in the region are driven in the L mode (status S5), the process advances to step S1013. If it is determined in step S1013 that the sum of the power value required when all the servers in the region are driven in the L mode is larger than the supply power value AC of the system power (status S7), the process advances to step S1015. In step S1015, an alert is output to indicate that "it is necessary to use the battery 222 to drive all the servers", and the process advances to step S1017. In step S1017, until it is determined in step S1007 that the power of the battery 222 is short, all the servers are driven in the L mode using the power of the battery 222.

The process advances to step S1019 to determine whether the power value required when all the servers are driven in the H mode is smaller than the sum of the supply power value AC of the system power and the supply power value BATT of the battery 222.

If the sum of the power values required when all the servers are driven in the H mode is equal to or larger than the sum of the supply power value AC of the system power and the supply power value BATT of the battery 222 (status S4), the process advances to step S1021 to determine whether to use the battery 222. If it is determined to use the battery, the process advances to step S1023, and until the sum of the required power value of all the servers becomes smaller than the sum of the supply power value AC of the system power and the supply power value BATT of the battery 222, the servers are sequentially switched from the H mode to the L mode from the server having a lower priority.

If it is determined in step S1021 not to use the battery 222, the process advances to step S1029, and until the sum of the required power values of all the servers becomes equal to or smaller than the supply power value AC of the system power, the driving modes of the servers are sequentially switched in the order of "H→L→sleep" from the server having a lower priority. The process further advances to step S1031, and if the supply power value AC of the system power has a surplus, the battery is charged.

By controlling the servers as described above, it is possible to effectively and efficiently supply power to the server system using the system power and the battery.

[Third Embodiment]

Figure 11:
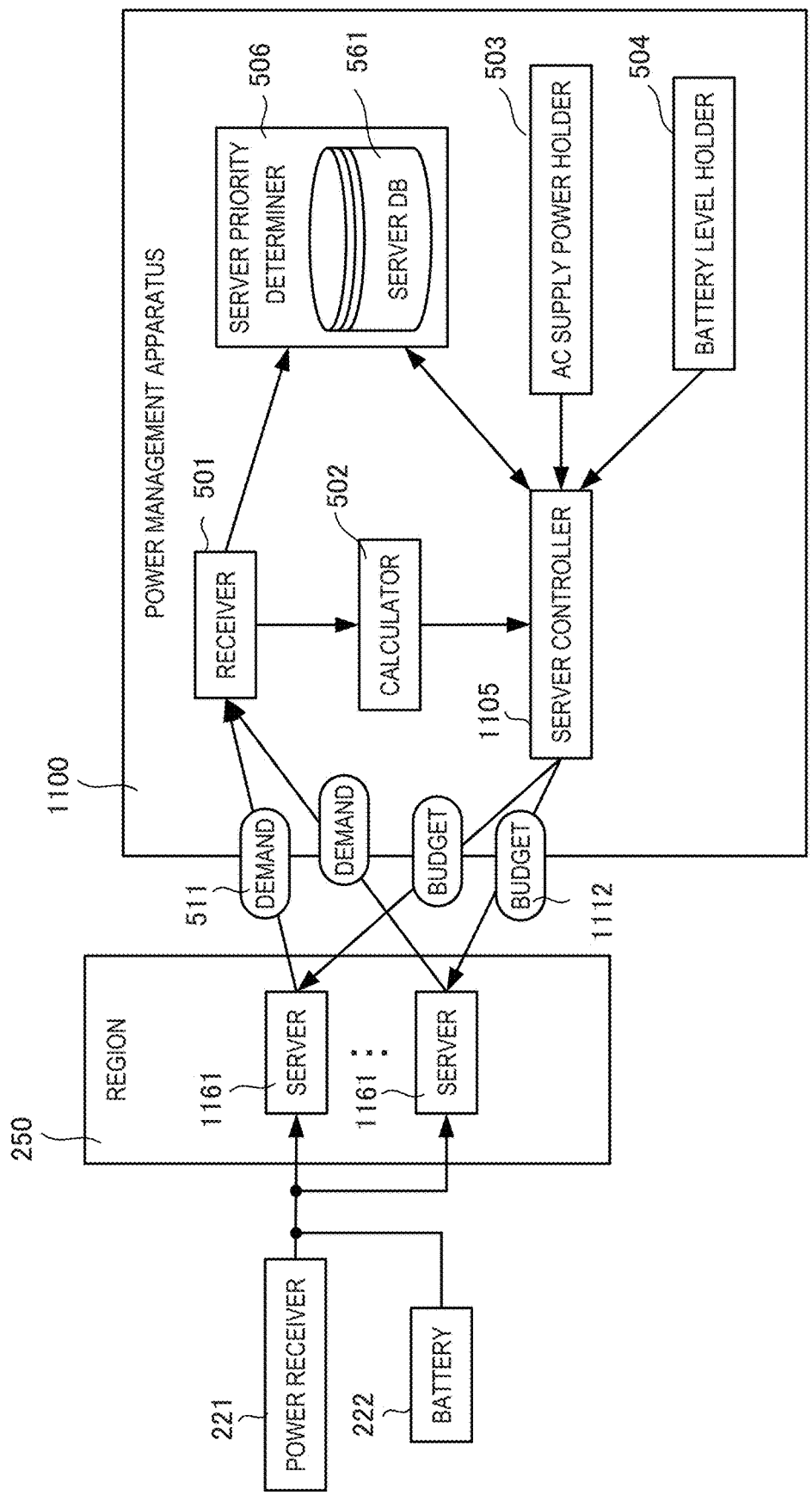
FIG. 11 is a block diagram showing the functional arrangement of a power management apparatus according to the third embodiment of the present invention.

A power management apparatus according to the third embodiment of the present invention will be described with reference to FIGS. 11 and 12. FIG. 11 is a block diagram for explaining the functional arrangement of the power management apparatus according to this embodiment. The power management apparatus according to this embodiment is different from the aforementioned second embodiment in that servers are notified of budgets about power instead of designating the driving modes of the servers. The other components and operations are the same as those in the second embodiment. Thus, the same reference numerals denote the same components and operations and a detailed description thereof will be omitted.

FIG. 11 is a block diagram showing the functional arrangement of the power management apparatus according to this embodiment. A power management apparatus 1100 includes a server controller 1105 that determines a budget 1112 (usable maximum electric energy) of each server, and notifies the server of it. Each server 1161 determines its driving mode in accordance with the budget 1112 received from the server controller 1105. The server controller 1105 calculates the upper limit value of an electric energy usable by each server in accordance with the priority of the server determined by a server priority determiner 506. The server controller 1105 notifies each of the plurality of servers 1161 of the upper limit value of an electric energy usable by the server 1161. Each server 1161 operates with an electric energy equal to or smaller than the notified upper limit value.

Figure 12:
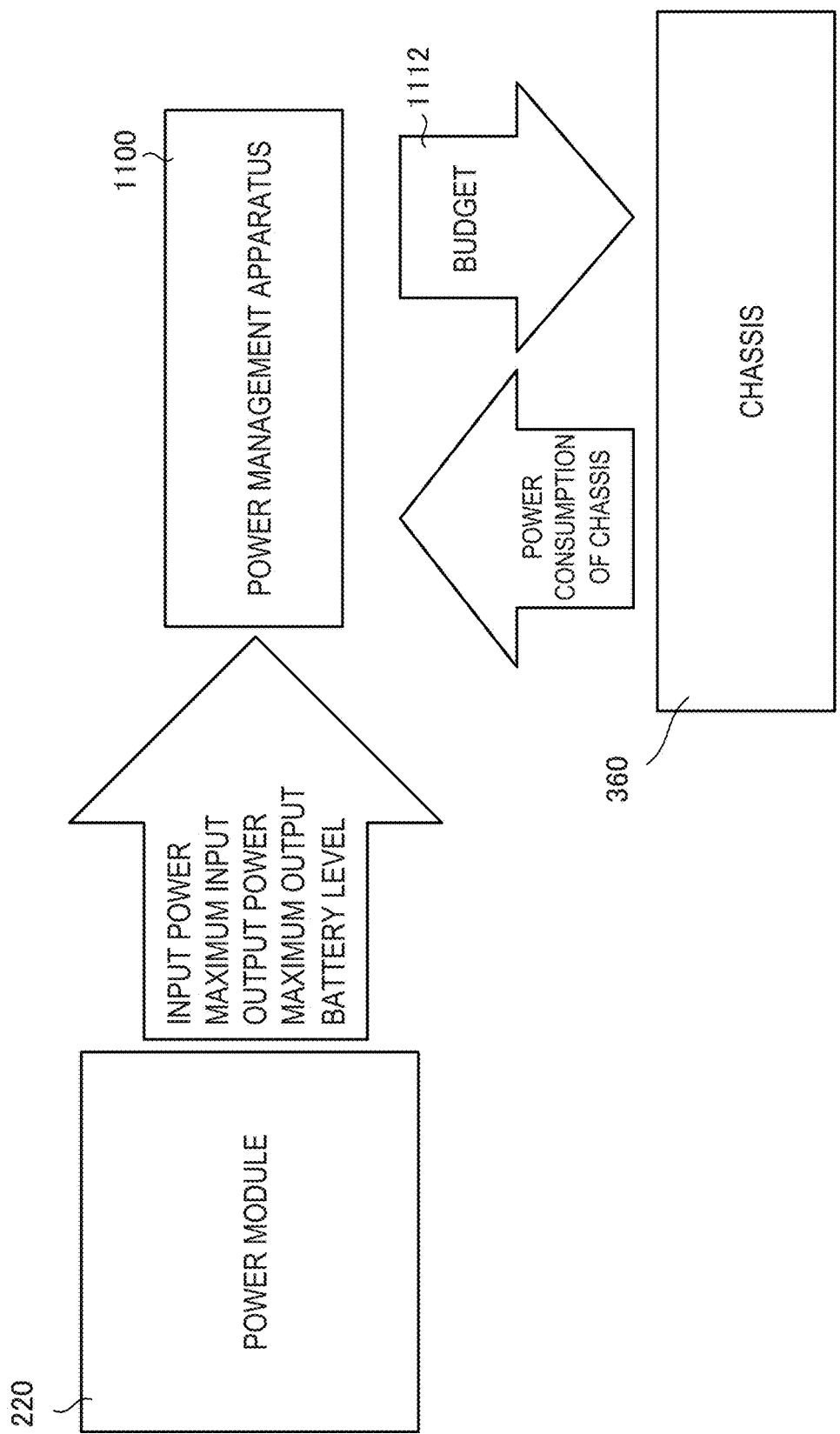
FIG. 12 is a view showing exchange of power supply relationship information according to the third embodiment of the present invention.

FIG. 12 is a view showing exchange of power supply relationship information according to this embodiment. As shown in FIG. 12, the power management apparatus 1100 notifies a chassis 360 of the budgets 1112. Although the server controller 1105 determines the budget of each server in this embodiment, the server controller 1105 may determine the budget of the plurality of servers (for example, the servers in the chassis 360). In this case, the plurality of servers share the budget. As a sharing method, for example, the plurality of servers may equally share the budget, or the server having a higher priority may secure the budget first, and return it if unnecessary.

With the above arrangement and operation according to this embodiment, it is possible to effectively and efficiently supply power to a server system using system power and a battery.

[Fourth Embodiment]

Figure 13:
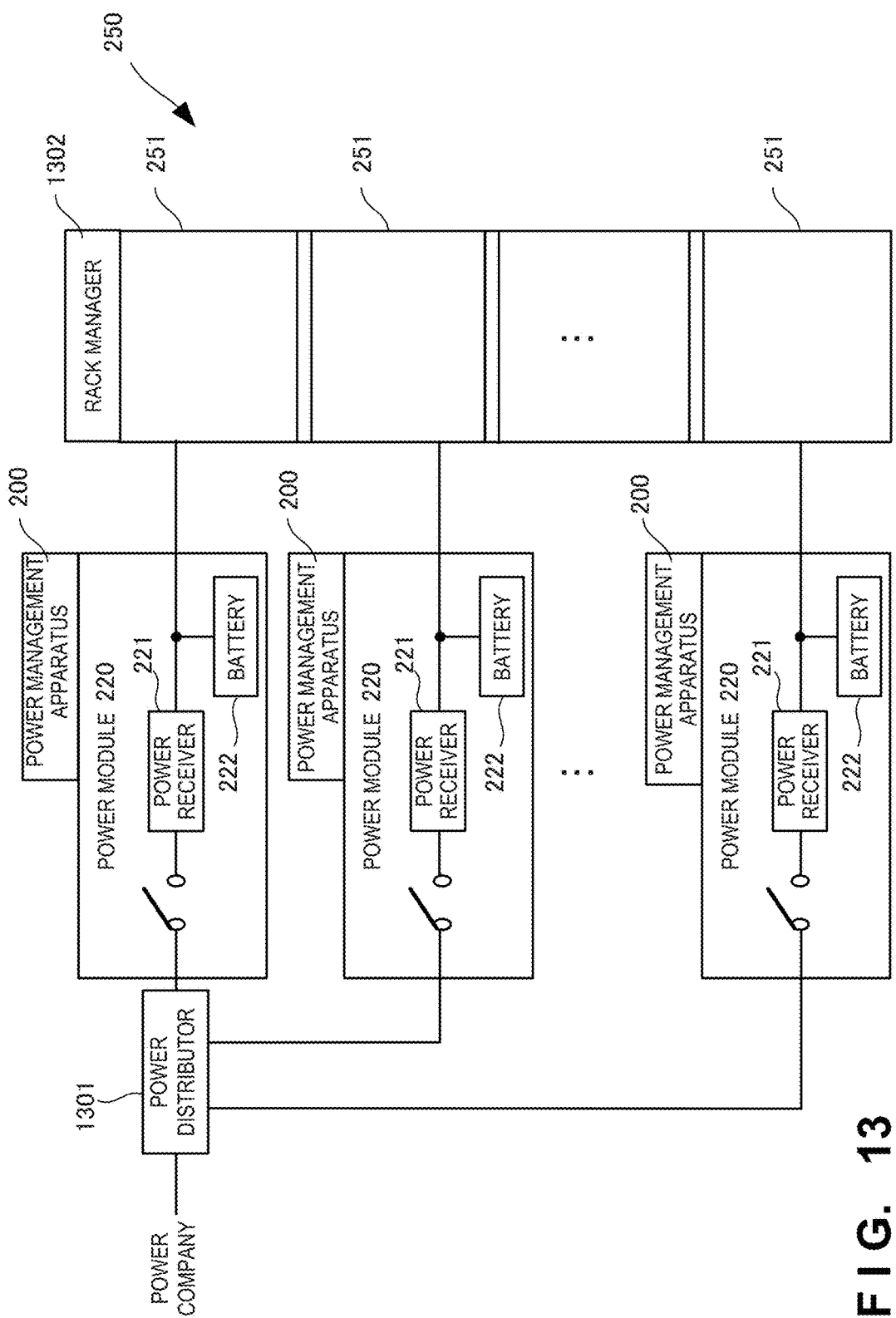
FIG. 13 is a block diagram showing the configuration of a server system according to the fourth embodiment of the present invention.

A power management apparatus according to the fourth embodiment of the present invention will be described with reference to FIGS. 13 and 14. FIG. 13 is a block diagram for explaining the functional arrangement of the power management apparatus according to this embodiment. The power management apparatus according to this embodiment is different from the aforementioned second embodiment in that the apparatus includes a power distributor 1301 that distributes system power to respective regions 251. The other components and operations are the same as those in the second embodiment. Thus, the same reference numerals denote the same components and operations and a detailed description thereof will be omitted.

The power distributor 1301 functions as a system power provider that distributes and provides the system power to the plurality of regions 251. A rack manager 1302 determines a power value to be distributed to each region 251 (or each server included in the region) based on the power consumption, requested power, and the like of the region 251, thereby controlling the power distributor 1301.

For example, the rack manager 1302 includes a table 1401 shown in FIG. 14. The table 1401 is used to manage, for each region, a maximum used electric energy, a minimum used electric energy, a requested electric energy, a region priority, and the state (the presence/absence of a battery, and the real-time power storage amount and maximum storage amount) of a provided battery.

According to this embodiment, it is possible to more flexibly control power supply for each region, and readily and effectively perform power control at the time of maintenance or power saving.

[Other Embodiments]

Note that although a server has been exemplified as an information processing apparatus to be supplied with power in the above second to fourth embodiments, the present invention is not limited to this and other apparatuses such as a PC (Personal Computer), storage apparatus, and network apparatus may be used. In this embodiment, the system power source and battery have been explained as power supply sources. However, the present invention is not limited to this, and it is only necessary to include two power sources. For example, the information processing apparatus may be controlled based on power from two power sources of a fossil fuel system power source and renewable energy system power source. Alternatively, for example, the driving mode of the information processing apparatus may be controlled in accordance with power values from three or more kinds of power sources. Although the H mode, L mode, and sleep mode have been exemplified as the driving modes of each server, another mode (for example, an M mode of power consumption between the power consumption in the H mode and that in the L mode) may be included.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program. The present invention specifically incorporates at least a non-transitory computer readable medium storing a program for causing the computer to execute the processing steps included in the above-described embodiments.

This application claims the benefit of Japanese Patent Application No. 2013-118362 filed on Jun. 4, 2013, which is hereby incorporated by reference herein in its entirety.

What is claimed is:

1. A server system in which a plurality of servers are divided into a plurality of groups in accordance with a physical arrangement, each of the plurality of servers can be driven in at least two driving modes including a high-power mode in which the power consumption is large and a low-power mode in which the power consumption is small, comprising:

at least one system power provider that distributes and provides system power to each of the plurality of groups;

a battery that corresponds to each of the plurality of groups and provides stored power to at least two servers included in the group;

a controller that controls said driving mode of each of the servers included in one group based on the presence/absence of a battery, and the real-time power storage amount and maximum supply power value of said one system power provide, a requested electric energy, and a server priority and notifies each of the plurality of servers of an upper limit value of an electric energy usable by the server, and causes the server to perform control with an electric energy not larger than the upper limit value, a server priority determiner that determines the priority based on a maximum used electric energy, a minimum used electric energy, a requested electric energy, and an application in progress, which have been received from each of the servers, wherein when a remaining power value of said battery is not larger than a predetermined value, said controller drives the server whose priority is low in a mode in which power consumption is smaller than power consumption of the server whose priority is high so as to drive the plurality of servers with only the power from said system power provider.

2. The server system according to claim 1, wherein said controller includes a database indicating for each of the plurality of groups, a maximum used electric energy, a minimum used electric energy, a region priority, the presence/absence of a battery, and the real-time power storage amount and maximum storage amount of said battery.

3. The server system according to claim 1, wherein the plurality of servers can be driven in at least two driving modes including a high-power mode in which power consumption is large and a low-power mode in which power consumption is small, and said controller determines the driving mode of each of the plurality of servers.

4. The server system according to claim 1, wherein said controller controls the servers included in one group based on power request information about an electric energy requested by the plurality of servers.

5. The server system according to claim 1, wherein said controller notifies each of the plurality of servers of an upper limit value of an electric energy usable by the server, and causes the server to perform control with an electric energy not lager than the upper limit value.

6. The server system according to claim 1, further comprising:
   a setting unit that sets a priority of each of the plurality of servers, wherein said controller controls the plurality of servers in accordance with the priorities so as to drive the plurality of servers with only power from said system power provider.

7. The server system according to claim 6, wherein said controller drives the server whose priori ty is low in a mode in which power consumption is smaller than power consumption of the server whose priority is high so as to drive the plurality of servers with only the power from said system power provider.

8. A control method for a server system in which a plurality of servers are divided into a plurality of groups in accordance with a physical arrangement, each of the plurality of servers can be driven in at least two driving modes including a high-power mode in which the power consumption is large and a low-power mode in which the power consumption is small, comprising:
   causing a system power provider to distribute and provide system power to each of the plurality of groups;
   providing stored power from a battery provided in correspondence with each of the plurality of groups to at least two servers included in the group;
   controlling said driving mode of each of the servers included in one group based on the presence/absence of a battery, and the real-time power storage amount and maximum supply power value of said on system power provide, a requested electric energy, and a server priority and notifies each of the plurality of servers of an upper limit value of an electric energy usable by the server, and causes the server to perform control with an electric energy not larger than the upper limit value,
   determining the priority based on a maximum used electric energy, a minimum used electric energy, a requested electric energy, and an application in progress, which have been received from each of the servers,
   wherein when a remaining power value of said battery is not larger than a predetermined value, the server whose priority is low in a mode in which power consumption is smaller than power consumption of the server whose priority is high is driven so as to drive the plurality of servers with only the power from said system power provider.

9. A non-transitory computer readable medium storing a control program, of a server system in which a plurality of servers are divided into a plurality of groups in accordance with a physical arrangement, each of the plurality of servers can be driven in at least two driving modes including a high-power mode in which the power consumption is large and a low-power mode in which the power consumption is small, for causing a computer to execute a method, comprising:
   causing a system power provider to distribute and provide system power to each of the plurality of groups;
   providing stored power from a battery provided in correspondence with each of the plurality of groups to at least two servers included in the group; and
   controlling said driving mode of each of the servers included in one group based on the presence/absence of a battery, and the real-time power storage amount and maximum supply power value of said on system power provide, a requested electric energy, and a server priority and notifies each of the plurality of servers of an upper limit value of an electric energy usable by the server, and causes the server to perform control with an electric energy not larger than the upper limit value,
   determining the priority based on a maximum used electric energy, a minimum used electric energy, a requested electric energy, and an application in progress, which have been received from each of the servers,
   wherein when a remaining power value of said battery is not larger than a predetermined value, the server whose priority is low in a mode in which power consumption is smaller than power consumption of the server whose priority is high is driven so as to drive the plurality of servers with only the power from said system power provider.

* * * * *